Feb. 7, 1950  J. C. McKALIP  2,496,883
GASOLINE TANK CAP

Filed March 16, 1945  2 Sheets-Sheet 1

INVENTOR.
J. C. McKALIP
BY Victor J. Evans & Co.
ATTORNEYS

Feb. 7, 1950     J. C. McKALIP     2,496,883
GASOLINE TANK CAP
Filed March 16, 1945     2 Sheets-Sheet 2
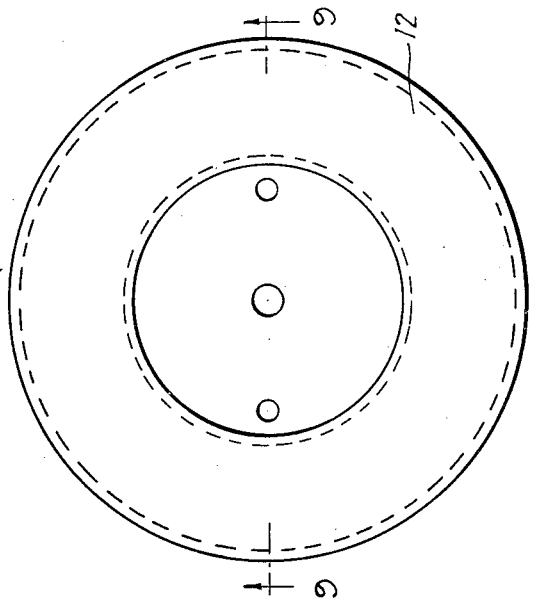
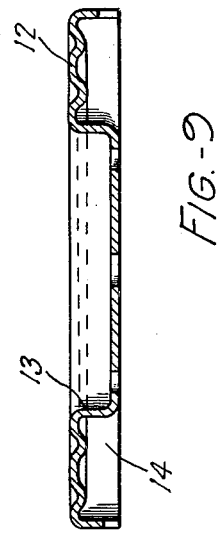
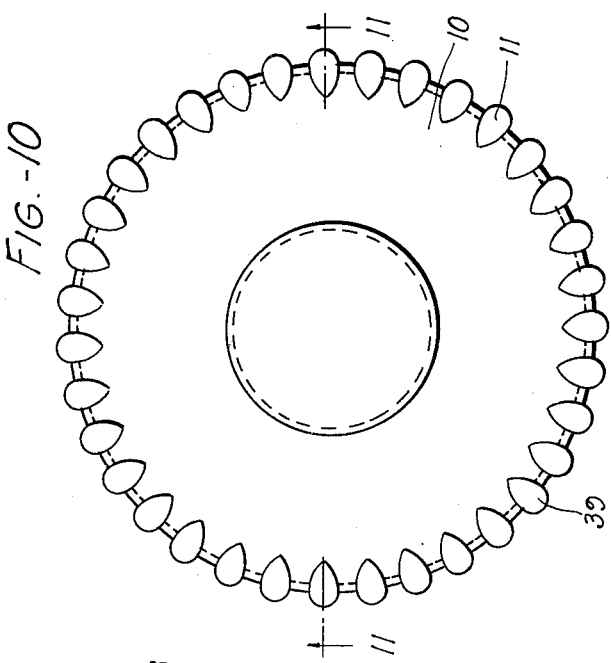
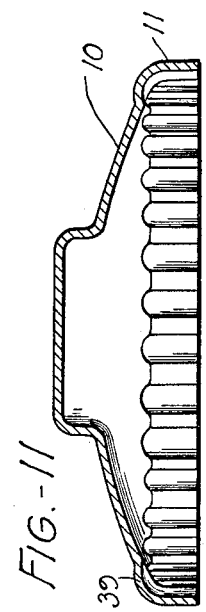
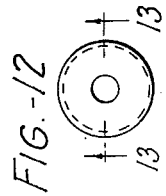
INVENTOR.
J. C. McKALIP
BY Victor J. Evans & Co.
ATTORNEYS Patented Feb. 7, 1950

2,496,883

UNITED STATES PATENT OFFICE 2,496,883

GASOLINE TANK CAP

James C. McKalip, Pittsburgh, Pa.

Application March 16, 1945, Serial No. 583,112

2 Claims. (Cl. 220—44)

The invention relates to a tank cap, and more particularly, to a gasoline tank cap for use on motor vehicles.

The primary object of the invention is the provision of a cap of this character, wherein the same is provided with a valve arrangement which cannot stick, cannot rust, cannot break or wear out during the average life of a motor vehicle, with which the cap is adapted to be associated, loss and deterioration of gasoline by evaporation is eliminated, and assures quicker starting of the motor and better engine performance.

Another object of the invention is the provision of a cap of this character, wherein the construction thereof is novel and the valve arrangement unique, and is a refinement over the subject matter disclosed in the prior art since the vent opening, air inlet and pressure valve are disposed in a more compact relationship and assure a more positive working in the use of the cap on a gasoline tank or the like as installed within a motor vehicle.

A further object of the invention is the provision of a cap of this character, wherein the escape of fuel vapor from the gasoline tank or the like is prevented, so that the vapor will accumulate or build up within the tank or the like under pressure controlled by the valve, for the purpose of forcing the liquid fuel to the fuel pump or carburetor thereby overcoming vapor locking troubles in the fuel line, fuel pump failures and the like, and maintaining the same volatile condition to the fuel as when placed in the tank or the like for consumption by the motor of the vehicle.

A still further object of the invention is the provision of a cap of this character, which is simple in construction, thoroughly reliable and efficient in operation, strong, durable, neat in appearance, universally adaptable to standard makes of fuel tanks or the like for motor vehicles, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 8 is a plan view of the base member for the cap.

Figure 9 is a sectional view taken on the line 9—9 of Figure 8 looking in the direction of the arrows.

Figure 10 is an outside plan view of the crowning body for the cap.

Figure 11 is a sectional view taken on the line 11—11 of Figure 10 looking in the direction of the arrows.

Figure 12 is a plan view of the spring retainer member of the cap.

Figure 13 is a sectional view taken on the line 13—13 of Figure 12 looking in the direction of the arrows.

Similar reference characters indicate corresponding parts throughout the several views in the drawings.

Figure 1:
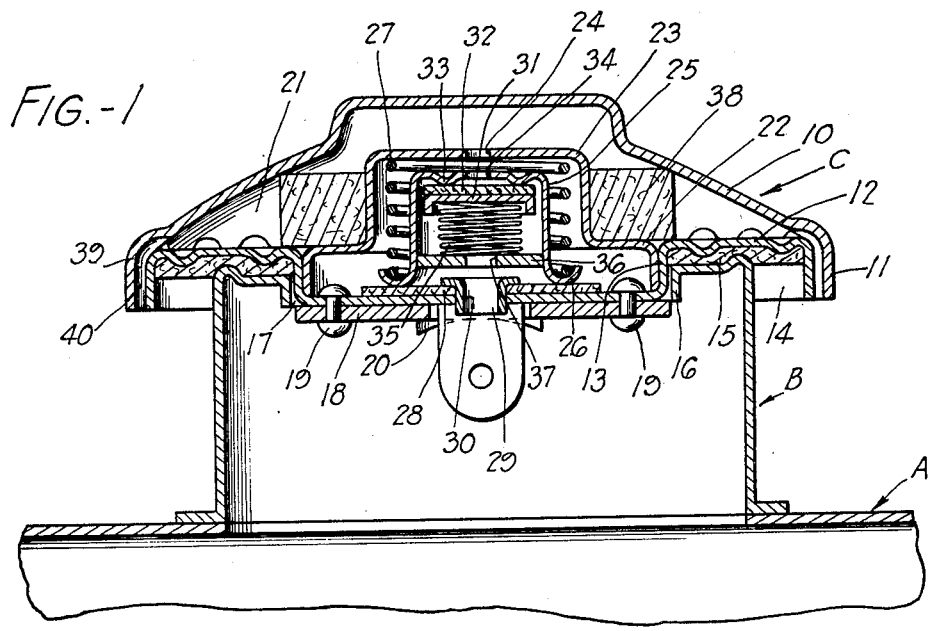
Figure 1 is a fragmentary vertical sectional view showing the cap constructed in accordance with the invention forming a closure for a filling spout of a fuel tank employed in a motor vehicle.
Figure 2:
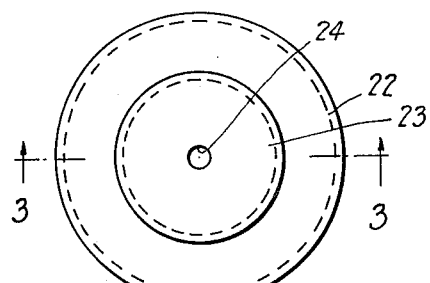
Figure 2 is a top plan view of inner dome housing for the valve of the cap.
Figure 3:
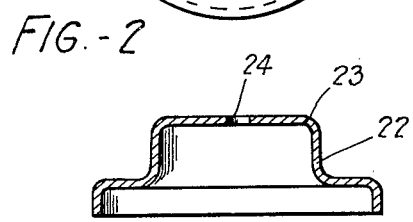
Figure 3 is a sectional view taken on the line 3—3 of Figure 2 looking in the direction of the arrows.
Figure 4:
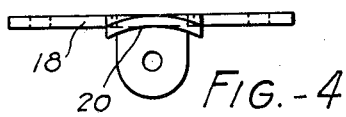
Figure 4 is an end elevation of the bridge piece for the cap.
Figure 5:
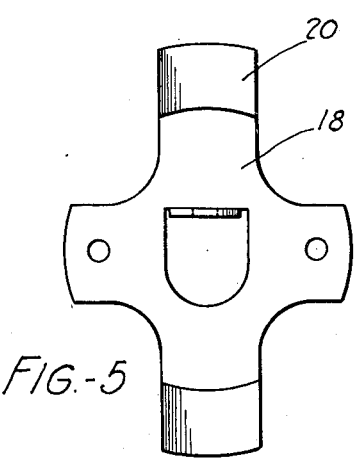
Figure 5 is a plan view thereof.
Figures 6, 7:
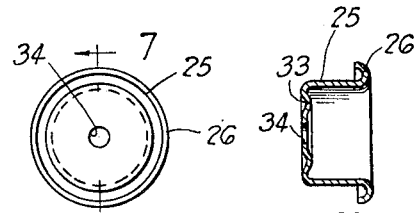
Figure 6 is a plan view of the exhaust valve.
Figure 7 is a sectional view taken on the line 7—7 of Figure 6 looking in the direction of the arrows.

Referring to the drawings in detail, A designates generally a portion of the fuel tank for a motor vehicle, B the filling spout for this tank, and C the closure cap constructed in accordance with the invention for the spout.

The closure cap C comprises an outwardly bulged substantially circular shaped crowning body 10, which has a fluted or corrugated marginal downturned rim 11, into which is telescopically fitted lining 12 having a countersunk centrally located circular area 13, about which is concentrically arranged a seating channel 14, having fitted therein an annular sealing gasket 15 for the beaded mouth edge 16 of the spout B and about the mouth opening 17 of the latter. The area 13 is adapted to engage therein when the cap C is applied to the spout B, as best seen in Figure 1 of the drawings.

The area 13 has secured thereto a cross-arm clamping member 18, which is fastened in place by rivets 19, and has its cam ears 20 adapted to engage with the mouth edge 16, there being suitable clearance in the latter to permit ears to pass beneath this edge 16 to engage thereunder with the same when the cap C is fitted onto the spout B, which is a common expedient.

In the space 21 between the crowning body 10 and the lining 12 is arranged a valve housing 22, which is fixedly seated in the area 13 and is formed with a dome 23 provided with a central aperture 24, and within this housing 22 and vertically aligned with the dome 23 is an inverted substantially cup-shaped exhaust valve 25, having an outwardly and upwardly curled channel edge 26, in which is seated a coiled expansion spring 27, the latter being also seated against the dome 23, so as to urge the valve seated with the edge 26 contacting with a fibrous disk-like seat 28 superimposed on the area 13, and made fast by an eyelet 29, which effects a center vent 30 therethrough forming communication between the housing 22 and the spout B. The valve 25 controls this vent 30.

Within the valve 25 is an intake valve 31 which has a leather facing 32 for seating against an annular rib 33 formed on the said valve 25 concentric to a center hole 34 therein, and this valve is urged to seating position by a coiled spring 35 working against it and held by a retainer disk 36 fixed within the hollow of the said valve 25, as best seen in Figure 1 of the drawings, the disk 36 being formed with a center opening 37, which aligns with the vent 30 formed by the eyelet 29 as before described.

Concentric about the dome 23 of the housing 22 is a fibrous ring 38 held in place by the crowning body 10, and is preferably made from felt, although it may be made from any other suitable material.

The fitting of the lining 12 with the rim 11 of the body 10, and through the arrangement of the corrugations 39 provided in the said rim 11 enables the venting of the space 21 with the atmosphere, as air passages 40 are created by such corrugations or flutes 39, as should be apparent from Figure 1 of the drawings. The ring 38 functioning as a filter interiorly of the cap C, prevents dust and minute particles of dirt in the air from being sucked into the cap and lodging under the mechanism controlling the intake valve 31 when gasoline is withdrawn from the tank. Such dust and dirt would prevent the valve from closing thereby rendering it inoperative thus preventing pressure from being built up in the tank.

Therefore since any dirt and dust prevented from entering the tank will eliminate such dirt and dust from the carburetor, the inclusion of the ring 38 in the device is a marked improvement over all known prior devices.

The cap C in the use thereof allows atmospheric air to enter the spout B to relieve any vacuum therein. When the vacuum is relieved, the vapor pressure will build up therein and thereby seat the valve 31, it being obvious that the vapor enters the valve 25 through the opening 37. When the vapor pressure has accumulated or is built up within the tank having the spout B to an excess amount, it will be apparent that it will lift the valve 25 and thereby allow the escape of the vapor through the corrugations or flutes 39 to the atmosphere.

What is claimed is:

1. A cap for filling spout of a fuel tank comprising a crowning body, a lining telescopically fitted within the crowning body and having a countersunk centrically located circular area with a vent opening therein, a valve housing tightly fitted within the countersunk circular area and having a dome extending upwardly above the lining and with a vent opening therein, an exhaust valve confined within the dome of the housing and normally seated against the lining and over the vent opening thereof, said exhaust valve having a vent opening, an intake valve confined within the exhaust valve and cooperating therewith to close its opening, and a filtering ring tightly fitted about the dome of the housing and extending between it and the crowning body, a spring extending between the exhaust valve and the dome of the housing to maintain the exhaust valve on its seat on the lining, and means on the lining adapted to secure the cap to the fuel tank spout.

2. A cap for filling spout of a fuel tank comprising a crowning body, a lining telescopically fitted within the crowning body and having a countersunk centrically located circular area with a vent opening therein, a valve housing tightly fitted within the countersunk circular area and having a dome extending upwardly above the lining and with a vent opening therein, an exhaust valve confined within the dome of the housing and normally seated against the lining and over the vent opening thereof, said exhaust valve having a vent opening, an intake valve confined within the exhaust valve and cooperating therewith to close its opening, and a filtering ring tightly fitted about the dome of the housing and extending between it and the crowning body, a spring extending between the exhaust valve and the dome of the housing to maintain the exhaust valve on its seat on the lining, and means on the lining adapted to secure the cap to the fuel tank spout, said crowning body and lining provided with openings outwardly of the filtering ring to provide a vent outwardly of the ring and with the atmosphere.

JAMES C. McKALIP.

REFERENCES CITED

The following references are of record in the file of this patent:

UNITED STATES PATENTS

| Number | Name | Date |
|---|---|---|
| 1,591,234 | Reid | July 6, 1926 |
| 2,020,383 | Scofield | Nov. 12, 1935 |
| 2,203,801 | Swank | June 11, 1939 |
| 2,181,969 | Eshbaugh | Dec. 5, 1939 |
| 2,314,330 | Eshbaugh et al. | Mar. 23, 1943 |
| 2,419,616 | White | Apr. 29, 1947 |

FOREIGN PATENTS

| Number | Country | Date |
|---|---|---|
| 667,336 | Germany | Nov. 9, 1939 |

OTHER REFERENCES

Ser. No. 340,456, Blau, Jr., et al. (A. P. C.), pub. May 25, 1943.